United States Patent [19]

Hederich et al.

[11] 4,255,151
[45] Mar. 10, 1981

[54] PROCESS FOR DYEING AND PRINTING CELLULOSE FIBRES

[75] Inventors: Volker Hederich; Günter Gehrke; Robert Kuth, all of Cologne; Werner Kühnel, Leverkusen, all of Fed. Rep. of Germany

[73] Assignee: Bayer Aktiengesellschaft, Leverkusen, Fed. Rep. of Germany

[21] Appl. No.: 81,969

[22] Filed: Oct. 4, 1979

[30] Foreign Application Priority Data

Oct. 24, 1978 [DE] Fed. Rep. of Germany ....... 2846229

[51] Int. Cl.³ .......................... D06P 3/82; C09B 1/50
[52] U.S. Cl. ........................................ 8/532; 8/675; 8/676; 8/918
[58] Field of Search ..................... 8/21 C, 21 R, 54.2, 8/39 R, 675, 676, 532

[56] References Cited

U.S. PATENT DOCUMENTS

| | | | |
|---|---|---|---|
| 3,349,104 | 10/1967 | Lodge | 8/40 |
| 3,505,362 | 4/1970 | Hederich et al. | 8/40 |
| 3,656,880 | 4/1972 | Blackwell | 8/21 C |
| 3,706,525 | 12/1972 | Blackwell et al. | 8/21 C |
| 3,711,245 | 1/1973 | Neumer | 8/21 C |
| 4,049,377 | 9/1977 | Schwab et al. | 8/21 C |

FOREIGN PATENT DOCUMENTS

| | | |
|---|---|---|
| 861671 | 6/1978 | Belgium . |
| 1144678 | 3/1963 | Fed. Rep. of Germany . |
| 1274064 | 8/1968 | Fed. Rep. of Germany . |
| 2524243 | 12/1976 | Fed. Rep. of Germany . |
| 2528743 | 1/1977 | Fed. Rep. of Germany . |
| 2754175 | 6/1978 | Fed. Rep. of Germany . |

*Primary Examiner*—A. Lionel Clingman
*Attorney, Agent, or Firm*—Sprung, Felfe, Horn, Lynch & Kramer

[57] ABSTRACT

In order to dye and print cellulose fibres swollen with water-miscible swelling agents or mixed fibres containing these fibres, the fibres are treated with dyestuffs which are free from sulphonic acid groups and carboxylic acid groups, of the general formula

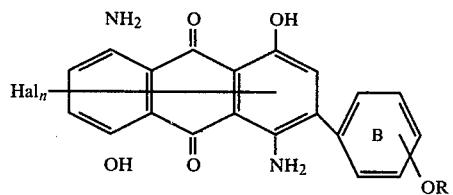

wherein
R denotes hydrogen or optionally substituted alkyl, aryl or acyl,
Hal denotes chlorine or bromine,
n denotes a number from 0 to 2 and the ring B can optionally be further substituted or fused, with the proviso that if R denotes hydrogen or methyl, n must be $>0$ and/or B must be further substituted,
and the dyestuffs are fixed by heat treatment.

3 Claims, No Drawings

PROCESS FOR DYEING AND PRINTING CELLULOSE FIBRES

The invention relates to a process for dyeing and printing cellulose fibres swollen with water-miscible swelling agents or mixed fibres containing these fibres.

The process is characterised in that the fibres are treated with a dyestuff which is free from sulphonic acid groups and carboxylic acid groups, of the general formula

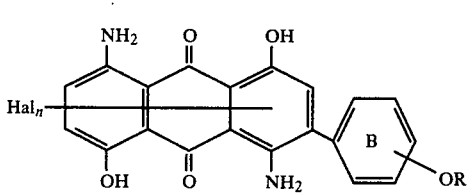

wherein

R denotes hydrogen or optionally substituted alkyl, aryl or acyl,

Hal denotes chlorine or bromine, n denotes 0, 1 or 2 and the ring B can optionally be further substituted or fused, with the proviso that if R denotes hydrogen or methyl, n must be >0 and/or B must be further substituted, and the dyestuff is fixed by heat treatment.

The invention also relates to dyestuff formulations containing a dyestuff of the formula (I) for dyeing and printing cellulose and cellulose-containing fibre material.

Preferred alkyl radicals R are those with 1–8, in particular 3–6, carbon atoms, which can optionally be interrupted by oxygen.

Preferred aryl radicals R are phenyl or naphthyl.

Preferred acyl radicals R are $C_1$–$C_6$-alkylcarbonyl radicals or cyclohexylcarbonyl radicals, $C_1$–$C_6$-alkylsulphonyl radicals or cyclohexylsulphonyl radicals, optionally substituted benzoyl or phenylsulphonyl and $C_1$–$C_4$-alkoxycarbonyl radicals.

Substituents of the aliphatic radicals R are preferably hydroxyl, $C_1$–$C_4$-alkoxy, cyano, $C_1$–$C_4$-alkoxycarbonyl, phenoxycarbonyl, phenyl or phenoxy.

Substituents of the aromatic radicals B and R, of which the radicals can contain one or two, are preferably $C_1$–$C_4$-alkyl, $C_1$–$C_4$-alkoxy, $C_1$–$C_4$-alkylmercapto, OH, phenyl, phenoxy, phenylmethyl, Cl or Br, $CF_3$ or cyano.

Examples of the substituents which may be mentioned are: for R: methoxycarbonylmethyl, ethoxycarbonylmethyl, propoxycarbonylmethyl, phenoxycarbonylmethyl, ethyl, methoxycarbonylethyl, hydroxyethyl, methoxyethyl, ethoxyethyl, butoxyethyl, n-propyl, isopropyl, n-butyl, isobutyl, n-pentyl, isoamyl, n-hexyl, isooctyl, cyanoethyl, phenylethyl, phenoxyethyl, phenoxy, acetyl, propionyl, chloroacetyl, ethoxyacetyl, phenoxyacetyl, phenylacetyl, butyryl, pentanoyl, hexanoyl, cyclohexanoyl, benzoyl, methylbenzoyl, isopropylbenzoyl, chlorobenzoyl, methyl-chlorobenzoyl, bromobenzoyl, trifluoromethylbenzoyl, propylbenzoyl, methoxybenzoyl, ethoxybenzoyl, diphenylcarbonyl, phenoxybenzoyl, methanesulphonyl, ethanesulphonyl, propanesulphonyl, methoxypropanesulphonyl, pentanesulphonyl, hexanesulphonyl, octanesulphonyl, cyclohexanesulphonyl, benzenesulphonyl, toluenesulphonyl, benzylsulphonyl, chlorobenzenesulphonyl, dichlorobenzenesulphonyl, methoxybenzenesulphonyl, ethoxybenzenesulphonyl, diphenylsulphonyl, methylmercaptobenzenesulphonyl, methoxycarbonyl, ethoxycarbonyl, isopropoxycarbonyl and phenoxycarbonyl; and in B: chlorine, bromine, hydroxyl, methoxy, isopropoxy, methyl, ethyl, n-propyl, n-butyl, 2′,3′—CH=CH—CH=CH—, phenyl and cyclohexyl.

Preferred dyestuffs are those of the formula

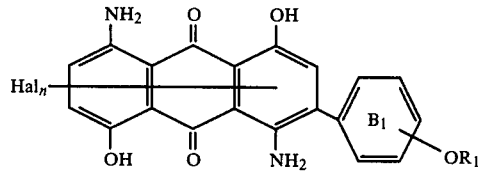

wherein $R_1$ denotes hydrogen, optionally substituted $C_1$–$C_4$-alkoxycarbonylmethyl or phenoxycarbonylmethyl, $C_1$–$C_6$-alkyl which is optionally substituted and/or interrupted by oxygen, optionally substituted phenyl, $C_1$–$C_6$-alkyl-carbonyl or -sulphonyl, benzoyl or phenylsulphonyl, $C_1$–$C_4$-alkoxycarbonyl or phenoxycarbonyl, $B_1$ denotes a phenylene radical which is optionally substituted by halogen, $C_1$–$C_6$-alkyl, hydroxyl, $C_1$–$C_4$-alkoxy, 2′,3′—(CH=CH)$_2$—, phenyl or cyclohexyl, Hal denotes chlorine or bromine and n denotes 0, 1 or 2, with the proviso that if $R_1$ denotes hydrogen or methyl, n must be >0 and/or $B_1$ must be further substituted, and wherein the alkyl, alkoxy, cyclohexyl, or phenyl radicals can be substituted by fluorine, chlorine, bromine, hydroxyl, $C_1$–$C_4$-alkoxy, hydroxyethyl, cyano or $C_1$–$C_4$-alkoxycarbonyl and the phenyl and cyclohexyl radicals can additionally be substituted by $C_1$–$C_4$-alkyl or $C_1$–$C_4$-alkylmercapto.

Of the dyestuffs of the formula II, those of the formula

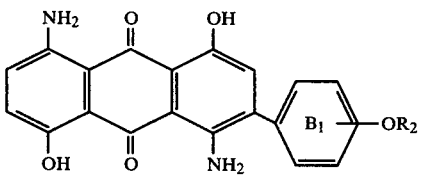

wherein $R_2$ represents $C_2$–$C_6$-alkyl which is optionally substituted and/or interrupted by 0, $C_1$–$C_4$-alkylcarbonyl or -sulphonyl or benzoyl or phenylsulphonyl which is optionally substituted by chlorine, bromine, $C_1$–$C_4$-alkyl, $C_1$–$C_4$-alkoxy, phenyl or phenoxy and $B_1$ has the meaning indicated in the case of formula II, are to be singled out.

Within the scope of formula III, the phenylene radical, $B_1$ is preferably unsubstituted and the radical $OR_2$ is in the para-position.

Of these compounds, compounds with acyloxy groups in the p-position are in turn to be singled out in particular.

The preparation of the dyestuffs (I) is effected by methods which are in themselves known, and is described, for example, in German Auslegeschriften No.

1,144,678, 1,284,544 and 1,274,064, in U.S. Pat. No. 3,505,362 and in Japanese Patent Specification No. 4,955,969.

Examples which may be mentioned are: the preparation from 1,5-dihydroxy-4,8-diamino-anthraquinone-2,6-disulphonic acid and suitable phenols and phenol ethers, the preparation from 1,5-dihydroxy-4,8-diamino-3-hydroxyphenyl-anthraquinones or corresponding anthraquinone-6-sulphonic acids by esterification with functional derivatives of aliphatic or aromatic carboxylic acids or sulphonic acids and if appropriate subsequent desulphonation with reducing agents, such as sodium hydrosulphite or zinc dust, and also the preparation from 1,5-dihydroxy-4,8-diamino-3-hydroxyphenyl-anthraquinones by etherification with halogenoalkanecarboxylic acid derivatives or halogenoalkanes in inert solvents or by oxyethylation of the phenolic hydroxyl groups or by subsequent halogenation of the reaction products obtained by the above methods with customary halogenating agents in organic solvents or a reaction medium containing sulphuric acid, and by reaction of corresponding quinoneimine derivatives with hydrogen chloride.

Both individual dyestuffs and mixtures of dyestuffs (I) can be employed in the process according to the invention. The dyestuff mixtures can be obtained either by subsequent mixing or already in the course of the preparation.

The dyestuffs to be used according to the invention are dyestuffs which are usually suitable for dyeing and printing synthetic fibres, such as cellulose ester fibres, polyamide fibres and, above all, polyester fibres, as is described, for example, in German Offenlegungsschrift No. 2,307,591.

It has now been found that the dyestuffs of the formula (I) which are free from fibre-reactive groups are outstandingly suitable for dyeing and printing cellulose fibres which are swellable in water and mixed fibres containing these fibres when they are applied by the processes known from German Auslegeschrift No. 1,811,796. In this process, the fibres are brought into contact with an amount of water sufficient to swell the cellulose and with a water-miscible swelling agent before or at the same time as being treated with the dyestuff. The swelling agent must be capable of maintaining the swelling of the cellulose when the water is removed and of dissolving the dyestuff, if necessary with the aid of an additional solubilising agent, at the dyeing temperature. The swelling agent is generally added in an amount of 10 to 30 percent by weight, relative to the cellulose fibres. Suitable swelling agents have a boiling point above 150° C.

The dyestuff and swelling agent can be applied simultaneously to the fibre, or the fibre can be treated first with the swelling agent and then with the aqueous dyestuff dispersion.

Finally, the dyestuff is fixed by heat treatment, in particular at 150°-230° C.

The process is suitable for dyeing and printing both natural cellulose and regenerated cellulose.

The process is of particular interest for dyeing and printing mixed fibres of cellulose and synthetic fibres, such as polyamide fibres and polyester fibres, in particular cotton/polyester mixed fibres, since they make matching-shade dyeing and printing in a one-stage procedure possible.

Processes of this type and other auxiliaries which can be used instead of the products known from German Auslegeschrift No. 1,811,796 are known, for example, from German Offenlegungsschriften Nos. 2,524,243, 2,528,743, 2,754,175 and 2,751,830.

The dyestuffs (I) give blue dyeings and prints, the colour shades of which match well on mixed fibres. They are distinguished by very good fastness properties, and besides the fastness to washing, fastness to sublimation, light and dry cleaning are to be singled out above all.

The dyestuff formulations according to the invention can contain the usual constituents, in addition to water, such as dispersing agents, for example non-ionic and/or anionic and/or cationic dispersing agents, thickeners and/or swelling agents and/or dyestuff solubilising agents.

The parts mentioned in the examples below are parts by weight and the degrees are degrees Centigrade.

EXAMPLE 1

(a) 200-300 parts of the dyestuff of the formula

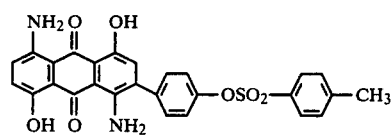

are brought together with 60 to 90 parts of a non-ionic dispersing agent and the mixture is made up to 1,000 parts with water and dispersed in a ball mill or another suitable apparatus. In order to prevent the dyestuff paste from drying too rapidly, a little preservative and glycols or glycerol can also be added.

(b) A polyester/cotton 50:50 fabric is printed with a printing paste consisting of

| | |
|---|---|
| 1-50 parts | of the dyestuff paste from paragraph a) |
| 100 parts | of polyethylene glycol (molecular weight of about 400) |
| 399-350 parts | of water and |
| 500 parts | of a 10% strength Guar flour thickener |
| 1,000 parts | | using a rotary screen printing machine or screen printing tables. (If a roller printing machine is used, the amount of polyethylene glycol must be increased to 150-200 parts, depending on the depth of the gravure cells.)

The fabric is then dried, the dyestuff is fixed at 210° with dry heat for 1 minute and the fabric is rinsed, soaped, rinsed again and dried.

A blue print which is fast to washing is obtained.

EXAMPLES 2-40

The procedure followed is as described in Example 1, but the dyestuffs of the formula

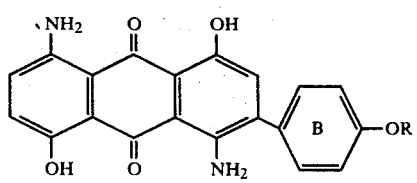

described in the following table are used. Prints which are fast to washing and have the colour shades indicated in the table are obtained.

| Example No. | —⟨B⟩—OR | Colour shade |
|---|---|---|
| 2 | ⟨⟩—OC$_4$H$_9$(n) | blue |
| 3 | ⟨⟩—OCH(CH$_3$)$_2$ | blue |
| 4 | ⟨⟩—OC$_2$H$_4$OCH$_3$ | blue |
| 5 | ⟨⟩—OC$_2$H$_5$ | blue |
| 6 | ⟨⟩—(OC$_2$H$_4$)$_2$OC$_4$H$_9$ | blue |
| 7 | ⟨⟩—(OC$_2$H$_4$)$_2$OCH(CH$_3$)$_2$ | blue |
| 8 | ⟨⟩(Cl)—OCH$_2$COOCH$_3$ | blue |
| 9 | ⟨⟩—OCH$_2$CH$_2$—COOC$_2$H$_5$ | blue |
| 10 | ⟨⟩—OCH$_2$COOC$_4$H$_9$ | blue |
| 11 | ⟨⟩(CH$_3$)—OCH$_2$—COOCH$_3$ | blue |
| 12 | ⟨⟩—OC$_3$H$_7$(n) | blue |
| 13 | ⟨⟩—OCH$_2$—CH(OH)—CH$_2$—CH$_3$ | blue |
| 14 | ⟨⟩—O(CH$_2$)$_3$—OCH$_3$ | blue |
| 15 | ⟨⟩—OCH$_2$—CH$_2$—CH(CH$_3$)—OCH$_3$ | blue |
| 16 | ⟨⟩(OC$_2$H$_4$OCH$_3$)—OC$_2$H$_4$OCH$_3$ | blue |
| 17 | H$_7$C$_3$O—⟨⟩—OC$_2$H$_4$OC$_2$H$_5$ | blue |
| 18 | ⟨⟩(OH)(C$_5$H$_{11}$) | blue |
| 19 | ⟨⟩(CH$_3$)(CH$_3$)—OH | blue |
| 20 | ⟨⟩—O—⟨⟩ | blue |
| 21 | ⟨⟩—OC$_2$H$_4$O—⟨⟩ | blue |
| 22 | ⟨⟩—OCH$_2$CN | blue |
| 23 | ⟨⟩—OCH$_2$—CH(CH$_3$)—CH$_3$ | blue |
| 24 | ⟨⟩—OSO$_2$C$_2$H$_4$OC$_2$H$_5$ | blue |
| 25 | ⟨⟩—OCOCH$_2$CH$_3$ | blue |
| 26 | ⟨⟩—OCO—⟨cyclohexyl⟩ | blue |
| 27 | ⟨⟩—OCOCH(CH$_3$)$_2$ | blue |
| 28 | ⟨⟩(OCH$_3$)—OCOCH$_3$ | blue |
| 29 | ⟨⟩—OCO—C$_6$H$_{13}$ | blue |
| 30 | ⟨⟩—OSO$_2$—⟨cyclohexyl⟩ | blue |
| 31 | ⟨⟩—OSO$_2$—⟨⟩ | blue |
| 32 | ⟨⟩—OSO$_2$—⟨⟩—OCH$_3$ | blue |
| 33 | ⟨naphthyl⟩—OH | blue |
| 34 | ⟨biphenyl⟩—OH | blue |
| 35 | ⟨⟩—OSO$_2$C$_4$H$_9$(n) | blue |
| 36 | ⟨⟩—OSO$_2$C$_5$H$_{11}$(n) | blue |
| 37 | ⟨⟩—OCO—⟨⟩(Cl)(Cl) | blue |
| 38 | ⟨⟩—OCO—⟨⟩—CH$_3$ | blue |
| 39 | ⟨⟩—OCO—⟨⟩—⟨⟩ | blue |
| 40 | ⟨⟩—OSO$_2$ CH$_2$—⟨⟩ | blue |

EXAMPLE 41

(a) 200–300 parts of the dyestuff of the formula

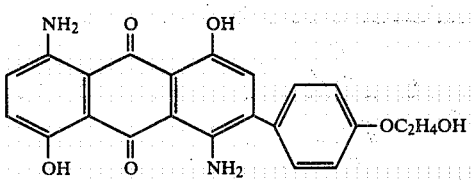

are brought together with 60 to 90 parts of a nonionic dispersing agent and the mixture is made up to 1,000 parts with water and dispersed in a ball mill or another suitable apparatus. In order to prevent the dyestuff paste from drying too rapidly, a little preservative and glycols or glycerol can also be added.

(b) A polyester/cotton 65:35 fabric is printed with a printing paste consisting of

| | |
|---|---|
| 1–50 parts | of the dyestuff paste from paragraph a) |
| 100 parts | of a boric acid ester of polyethylene glycol (molecular weight of 300) |
| 399–350 parts | of water and |
| 500 parts | of a 4% strength alginate thickener |
| 1,000 parts | | using a rotary screen printing machine or screen printing tables.

The fabric is then dried, the dyestuff is fixed at 210° with dry heat for 1 minute and the fabric is rinsed, soaped, rinsed again and dried. A blue print which is fast to washing is obtained.

EXAMPLE 42

30 parts by weight of the dyestuff

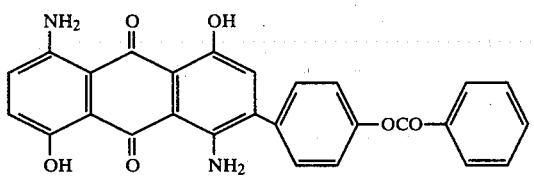

are finely dispersed with 15 parts by weight of a reaction product of abietic acid and about 50 mols of ethylene oxide, and 55 parts of water with the aid of a bead mill. The following dye liquor is prepared from this finished dye-stuff:

| | |
|---|---|
| 70 parts | of dyestuff formulation |
| 100 parts | of a polyethylene glycol of molecular weight 500 |
| 10 parts | of a 10% strength aqueous solution of a polyacrylate and |
| 820 parts | of water |
| 1,000 parts | |

A polyester/cotton mixed fibre with a polyester:cotton ratio of 65:35 to 50:50 is impregnated with the aid of a padder, the liquor pick-up of the fabric being 35–50%. The fabric treated in this manner is dried and the dyestuff is fixed on both fibres by a hot air treatment in a thermosol unit at 215° for 60 seconds.

After the usual after-treatment of soaping at 60° and after drying, a full blue colour shade which gives a very good match on the two materials is obtained. The dyeing produced has good fastness to daylight and fastness to dry grinding and wet grinding, and very good fastness to washing.

EXAMPLE 43

A polyester/cotton 50:50 fabric is padded with a 10% strength solution of polyethylene glycol of molecular weight ~400 and with a squeezing effect of ~100%. It is then printed with a paste comprising 1–100 parts of a 30% strength paste of the dyestuff

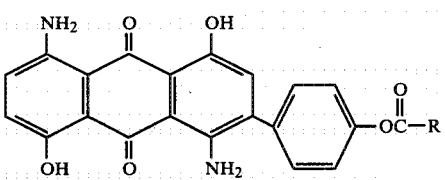

R = CH$_3$/C$_6$H$_5$ 1:1

40–50 parts of a thickener concentrate which essentially consists of polyacrylate acid broken down under alkaline conditions, and 900 parts of water.

The fabric is then dried and the dyestuff is fixed at 175° with high-temperature steam for 6 minutes. After rinsing, soaping and rinsing again, a blue print with good fastness properties is obtained.

The dystuff paste can be obtained analogously to the statements in Example 1.

EXAMPLES 44–69

The procedure followed is as indicated in Examples 24–26, but the dyestuffs of the formula

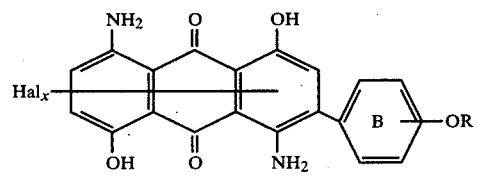

described in the following table are used. Prints with good fastness properties are obtained in the colour shade given in the last column.

| Example No. | Hal | x | B | Colour shade |
|---|---|---|---|---|
| 44 | — | — | ⟨phenyl⟩—O(C$_2$H$_4$O)$_3$CH$_3$ | blue |
| 45 | — | — | ⟨phenyl⟩—OCH$_2$CH$_2$OCH$_2$CH$_2$CN | blue |

-continued
| Example No. | Hal | x | B | Colour shade |
|---|---|---|---|---|
| 46 | — | — | 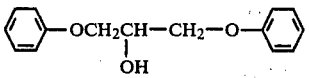 | blue |
| 47 | 7-Cl | 1 | 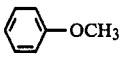 | blue |
| 48 | 7-Cl | 1 | 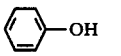 | blue |
| 49 | 6-Cl | 1 | 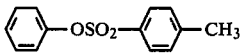 | blue |
| 50 | Cl | 1,5 | 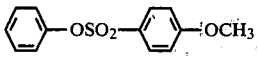 | blue |
| 51 | Cl | 0,8 | 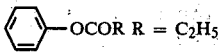 —OCOR R = $C_2H_5$ | blue |
| 52 | Cl | 1,2 | 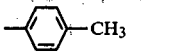 | blue |
| 53 | Br | 0,4 | 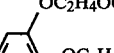 | blue |
| 54 | 7-Br | 1 | 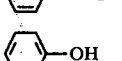 | blue |
| 55 | 7-Br | 1 | 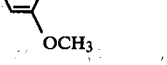 | blue |
| 56 | 6,X-Br | 2 |  | blue |
| 57 | 6,X-Br | 2 | 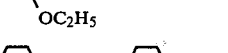 —OCOR R = —$CH_3$ <br> —$C_3H_7$ | blue |
| 58 | 6,X-Br | 2 | 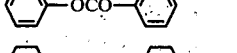 | blue |
| 59 | 7-Cl | 1 | 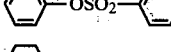 | blue |
| 60 | 7,X-Cl | 2 | 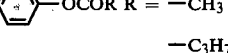 | blue |
| 61 | — | — | 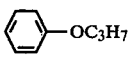 | blue |
| 62 | — | — | 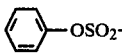 | blue |
| 63 | — | — | 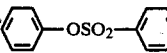 | blue |
| 64 | — | — |  | blue |
| 65 | Cl | 0,9 | 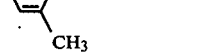 | blue |
| 66 | Br | 1,8 | 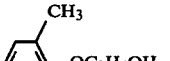 | blue |

-continued

| Example No. | Hal | x | B | Colour shade |
|---|---|---|---|---|
| 67 | Br | 1,5 | 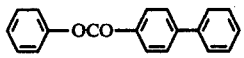 | blue |
| 68 | 7-Br | 1 | 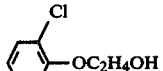 | blue |
| 69 | Br | 1,2 | 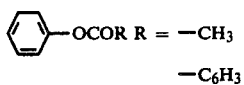 OCOR R = —CH$_3$ —C$_6$H$_3$ | blue |

We claim:

1. In the dyeing and printing cellulose fibers applying to said fibers an aqueous solution of a water-miscible swelling agent capable of maintaining the fibers in swollen condition after removal of water, boiling above 150° C. and having dispersed therein an anthraquinone dye which is free from sulphonic acid and carboxylic acid groups, and thereafter heating to fix the dye, the improvement which comprises employing as said anthraquinone a compound of the formula

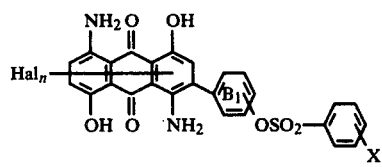

wherein
Hal is chlorine or bromine,
n is 0, 1 or 2,
B$_1$ is a phenylene radical which is optionally substituted by halogen, C$_1$–C$_6$-alkyl, hydroxyl, C$_1$–C$_4$-alkoxy, 2′,3′—(CH=CH)$_2$—, phenyl or cyclohexyl, and
X is hydrogen, fluorine, chlorine, bromine, hydroxyl, C$_1$–C$_4$-alkoxy, hydroxyethyl, cyano, C$_1$–C$_4$-alkoxycarbonyl, C$_1$–C$_4$-alkyl or C$_1$–C$_4$-alkylmercapto.

2. A process according to claim 1, in which X is hydrogen and

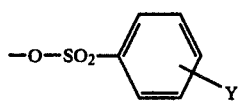

is in para-position on ring B.

3. A process according to claim 1, in which the dye is of the formula

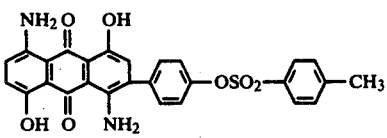

* * * * *